(12) United States Patent
Stener

(10) Patent No.: US 11,999,302 B2
(45) Date of Patent: Jun. 4, 2024

(54) CLAMP ASSEMBLY FOR MOUNTING A MOBILE DEVICE

(71) Applicant: YONDER FUND LLC, Dallas, TX (US)

(72) Inventor: Gavin Stener, Dallas, TX (US)

(73) Assignee: Yonder Fund LLC, Dallas, TX (US)

( * ) Notice: Subject to any disclaimer, the term of this patent is extended or adjusted under 35 U.S.C. 154(b) by 663 days.

(21) Appl. No.: 16/932,673

(22) Filed: Jul. 17, 2020

(65) Prior Publication Data
US 2022/0017021 A1 Jan. 20, 2022

(51) Int. Cl.
| | | |
|---|---|---|
| B60R 11/02 | (2006.01) | |
| B60R 11/04 | (2006.01) | |
| F16B 2/00 | (2006.01) | |
| F16B 2/06 | (2006.01) | |
| B60R 11/00 | (2006.01) | |

(52) U.S. Cl.
CPC ...... *B60R 11/0241* (2013.01); *B60R 11/0252* (2013.01); *B60R 11/0258* (2013.01); *B60R 11/04* (2013.01); *F16B 2/005* (2013.01); *F16B 2/065* (2013.01); *B60R 2011/0059* (2013.01); *B60R 2011/0089* (2013.01)

(58) Field of Classification Search
CPC ............. B60R 11/0241; B60R 11/0252; B60R 11/0258; B60R 11/04; B60R 2011/0059; B60R 2011/0089; B60R 11/02; F16B 2/005; F16B 2/065; F16B 37/045; F16B 37/046; F16L 3/2431; H02G 3/263; H02G 3/32; B64D 11/0023; E04D 3/08
See application file for complete search history.

(56) References Cited

U.S. PATENT DOCUMENTS

| | | | | |
|---|---|---|---|---|
| 3,969,855 A | * | 7/1976 | Lendi | E04H 6/06 52/177 |
| 4,630,982 A | * | 12/1986 | Fenner | B61D 45/001 403/381 |
| 4,915,342 A | * | 4/1990 | Nilsson | B21D 1/145 248/500 |
| 5,209,619 A | * | 5/1993 | Rinderer | F16B 37/045 411/85 |
| 5,271,586 A | * | 12/1993 | Schmidt | F16B 37/046 248/68.1 |
| 6,409,063 B1 | * | 6/2002 | Kmita | F16B 37/045 410/105 |
| 6,726,117 B2 | * | 4/2004 | Herb | F16B 37/046 238/315 |

(Continued)

*Primary Examiner* — Kimberly T Wood
(74) *Attorney, Agent, or Firm* — Foley & Lardner LLP

(57) ABSTRACT

A clamp assembly may include an upper clamp member and a lower clamp member removably coupled to the upper clamp member. The upper clamp member may include a first projection extending from a lower surface thereof. The first projection may be configured to be at least partially received in a complementary opening of a mounting member. The lower clamp member may be removably coupled to the upper clamp member. The lower clamp member may include a second projection extending from an upper surface thereof. The second projection may be configured to be at least partially received in the complementary opening. The first projection and the second projection may be configured to substantially impede rotation of the clamp assembly relative to the mounting member.

18 Claims, 9 Drawing Sheets

(56) References Cited

U.S. PATENT DOCUMENTS

| | | | |
|---|---|---|---|
| 9,458,952 B2* | 10/2016 | Zhang ..................... | F16L 3/10 |
| 2013/0320175 A1* | 12/2013 | Kemple ................ | F24S 25/65 |
| | | | 248/316.1 |
| 2020/0207279 A1* | 7/2020 | Kulick ................... | B60R 11/00 |

* cited by examiner

CLAMP ASSEMBLY FOR MOUNTING A MOBILE DEVICE

BACKGROUND

Generally speaking, mounting systems for mobile devices (e.g., smart phones, laptops, tablets, cameras, GPS units, etc.) may include a mounting member, such as a rail, a plate, or other type of mounting member, which may be coupled to a fixed mounting surface, such as in a vehicle environment. The mounting member may define one or more mounting points to couple a mounting assembly thereto. The mounting assembly may include features for coupling various components (e.g., arms, mobile devices, etc.) to the mounting member. These mounting assemblies, however, can be unstable and prone to unexpected movement on the mounting member, which is generally undesirable.

Accordingly, it would be advantageous to provide a mounting assembly that is more stable and is less prone to relative movement, as compared to some conventional mounting assemblies.

SUMMARY

To provide for an improved vehicular mounting system as compared to conventional vehicular mounting systems, one embodiment relates to a clamp assembly to clamp onto a rail that is provided by or not provided by the manufacturer of the clamp assembly. The clamp assembly may include an upper clamp member and a lower clamp member removably coupled to the upper clamp member. The clamp assembly may further include a mount attached to the upper clamp member. The upper clamp member may include a first projection extending from a lower surface thereof. The first projection may be configured to be at least partially received in a complementary opening of a mounting member. The lower clamp member may be removably coupled to the upper clamp member. The lower clamp member may include a second projection extending from an upper surface thereof. The second projection may be configured to be at least partially received in the complementary opening. The first projection and the second projection may be configured to substantially impede rotation of the clamp assembly relative to the mounting member when extended in the complementary opening.

Another embodiment of a clamp assembly may include an upper clamp member and a lower clamp member removably coupled to the upper clamp member. The clamp assembly may further include a mount attached to the upper clamp member. The upper clamp member may include a first portion, a second portion that extends outwardly from opposites sides of the first portion, and a first pad disposed on a bottom surface of the upper clamp member. The second portion extends at an obtuse angle relative to a bottom surface of the first portion. The first pad may be configured to engage a mounting member. The second portion and the first pad may be cooperatively configured to substantially impede rotation of the clamp assembly relative to the mounting member.

Another embodiment of a clamp assembly may include an upper clamp member and a lower clamp member removably coupled to the upper clamp member. The clamp assembly may further include a mount attached to the upper clamp member. The upper clamp member includes a first portion, a second portion extending outwardly from opposites sides of the first portion, and a projection extending from a bottom surface of the first portion. The second portion may extend at an obtuse angle relative to the bottom surface of the first portion. The projection may be configured to be at least partially received in a complementary opening of a mounting member. The second portion and the projection may be cooperatively configured to substantially impede rotation of the clamp assembly relative to the mounting member.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, disclosed herein are various embodiments of a clamp assembly for mounting a mobile device. The disclosed clamp assemblies include features that can, advantageously, help to reduce relative movement between the clamp assembly and a mounting member and can provide for a more stable mounting interface for a mobile device, as compared to some conventional mounting assemblies.

According to an exemplary embodiment, a clamp assembly may include an upper clamp member and a lower clamp member that include one or more projections that are configured to be received in a complementary opening of a mounting member. The projections have a structural configuration that can, advantageously, help to substantially impede rotational movement of the clamp assembly relative to the mounting member, so as to provide for a more stable mounting interface.

In some exemplary embodiments, the upper clamp member may include a first portion and a second portion extending outwardly at an obtuse angle from opposite sides of the first portion. The second portion may define an inner surface profile of the upper clamp member that is complementary to an outer surface profile of the mounting member, so as to help impede relative movement between the clamp assembly and the mounting member.

In some exemplary embodiments, the upper clamp member and/or the lower clamp member may include a compressible pad that is configured to engage a portion of the mounting member, so as to create a friction-fit interface. In this way, the pad can help to impede rotation of the clamp assembly relative to the mounting member.

These and other features will become apparent to those reviewing the present disclosure and claims.

Figure 1:
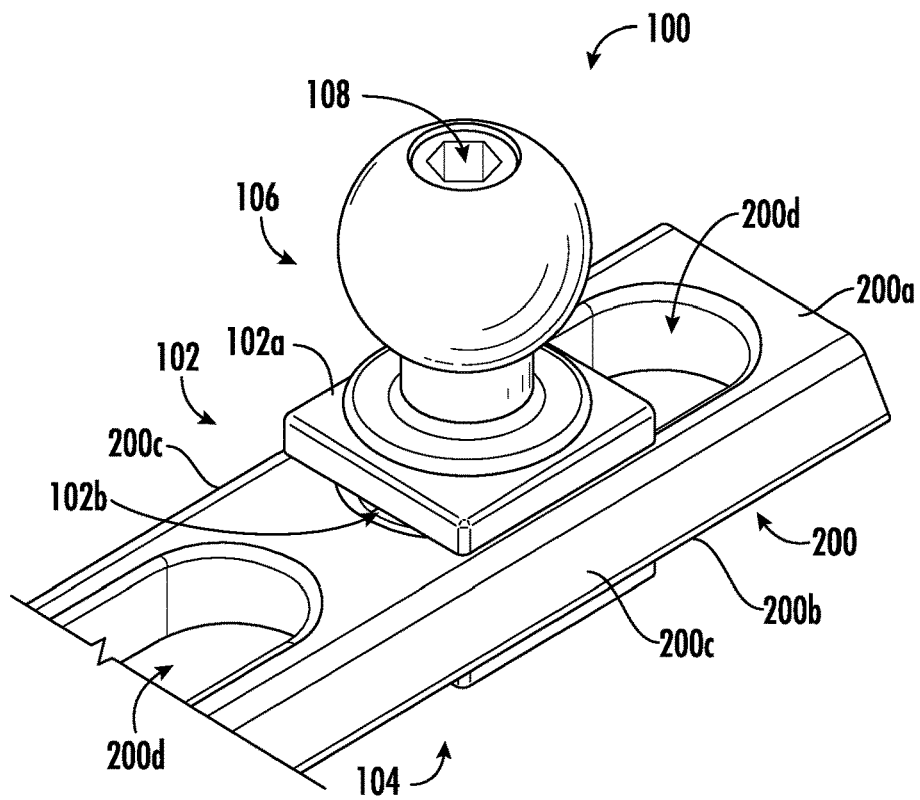
FIG. 1 is a partial perspective view of an illustrative clamp assembly coupled to an illustrative mounting member, according to an exemplary embodiment.
Figure 2:
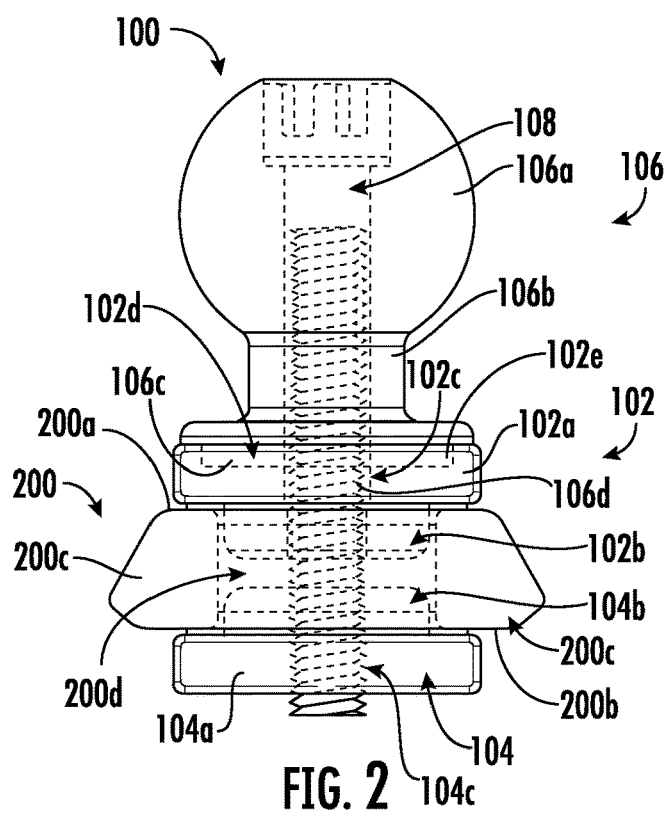
FIG. 2 is a side view illustrating an illustrative internal structure of the clamp assembly of FIG. 1.
Figure 12:
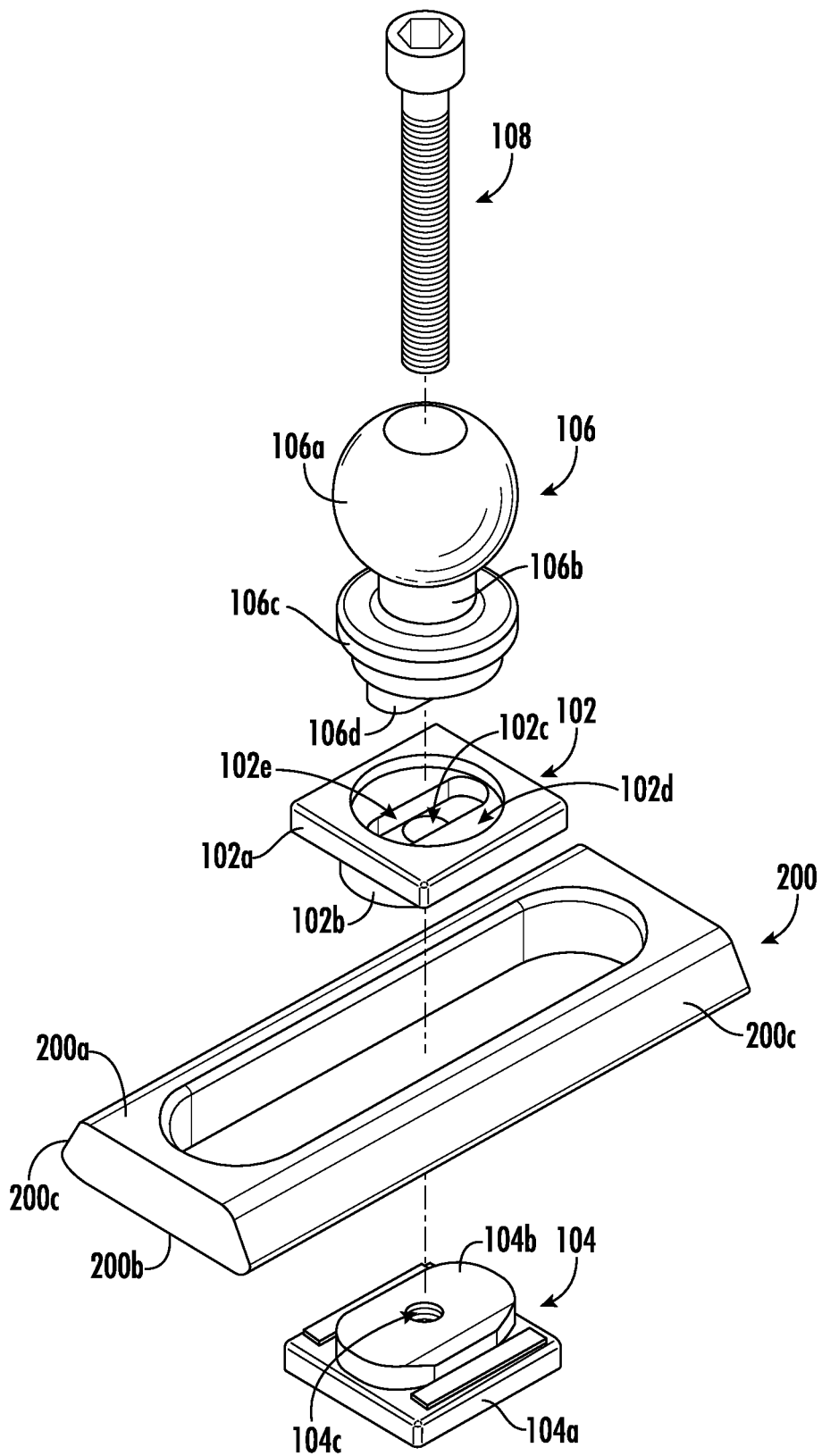
FIG. 12 is an exploded view of the clamp assembly of FIG. 1.
Figure 13:
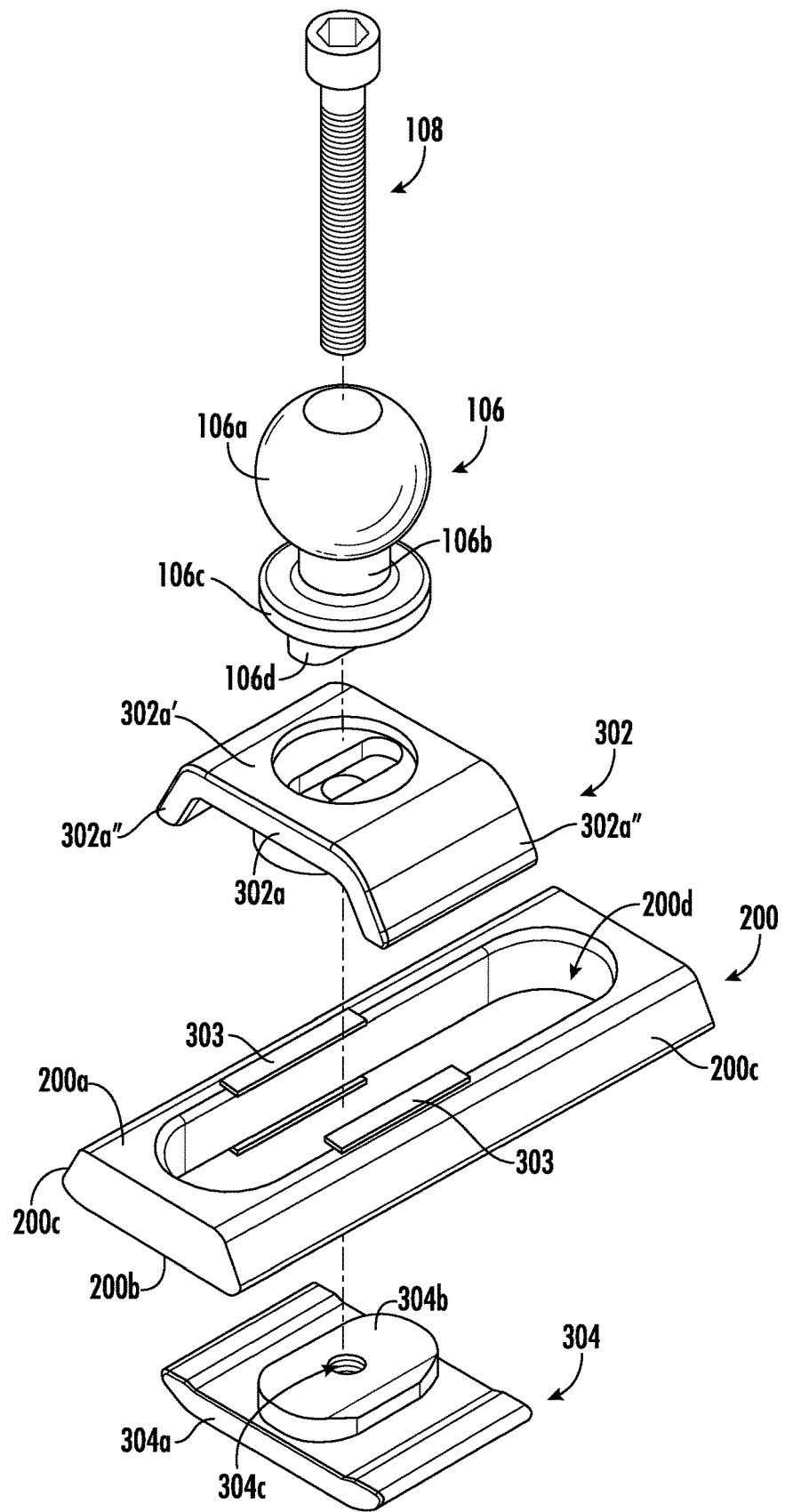
FIG. 13 is an exploded view of the clamp assembly of FIG. 5.
Figure 14:
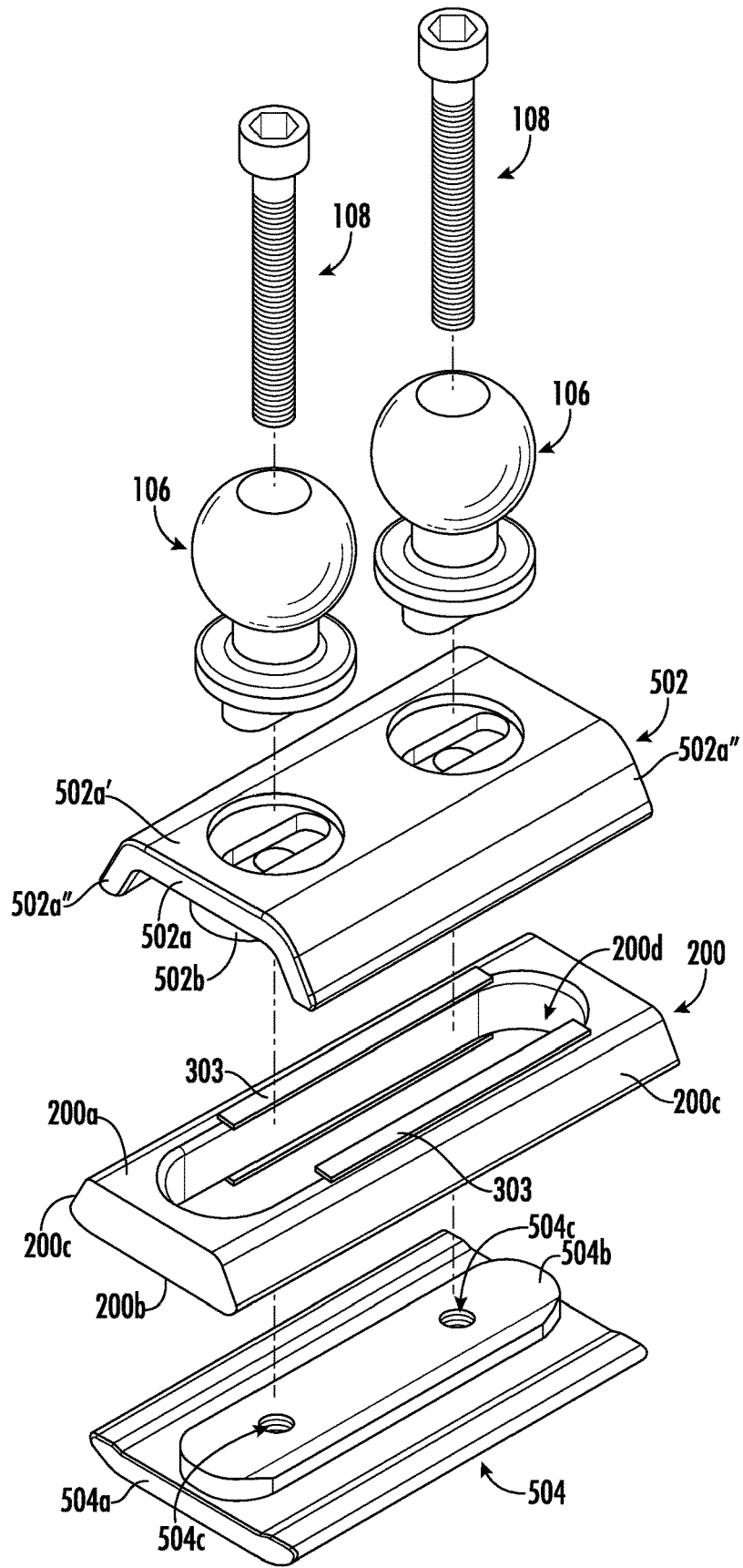
FIG. 14 is an exploded view of the clamp assembly of FIG. 9.

Referring to FIGS. 1-2 and 12, an illustrative clamp assembly 100 is shown according to an exemplary embodiment. The clamp assembly 100 is removably coupled to a mounting member, shown as a rail 200, according to the exemplary embodiment of FIGS. 1-2 and 12. According to other exemplary embodiments, the mounting member may be a plate, a rod, a planar member, a non-planar member, or any other type of member capable of mounting the disclosed clamp assembly thereto. The mounting member may be coupled to, or integrally formed with, a fixed mounting surface, such as in a vehicle environment (e.g., dashboard, pre-configured mounting structure, etc.), a home environment, an office environment, or any other type of environment where it may be desirable to mount a mobile device (e.g., mobile phone, tablet, laptop, GPS unit, camera, etc.).

As shown in the embodiment of FIGS. 1-2 and 12, the rail 200 is a generally elongated member having a trapezoidal cross-sectional shape, although it should be appreciated that the rail 200 may have other cross-sectional shapes, according to other exemplary embodiments. The rail 200 is defined by an upper surface 200a, an opposite lower surface 200b, and side surfaces 200c connecting the upper surface 200a and the lower surface 200b. The side surfaces 200c extend outwardly at obtuse angles relative to the upper surface 200a to define the trapezoidal cross-sectional shape of the rail 200. The rail 200 further includes one or more elongated slots or openings 200d extending from the upper surface 200a through the lower surface 200b. According to other exemplary embodiments, the rail 200 includes one or more discrete circular openings extending therethrough may be defined by the lower surface. In another embodiment, rather than extending through the rail, one or more recessions may be defined by the rail such that an attachment member or mounting member may be secured to the rail.

Still referring to FIGS. 1-2 and 12, the clamp assembly 100 includes an upper clamp member 102 removably coupled to a lower clamp member 104 with a portion of the rail 200 disposed therebetween. The upper clamp member 102 is engaged with the upper surface 200a of the rail 200 and the lower clamp member 104 is engaged with the lower surface 200b. The upper clamp member 102 is removably and adjustably coupled to the lower clamp member 104 by a fastener, shown as a bolt 108, according to the exemplary embodiment of FIGS. 1-2 and 12. The bolt 108 extends through an opening 102c of the upper clamp member 102 and is threadably engaged with the lower clamp member 104 via an opening 104b of the lower clamp member 104, such that the lower clamp member 104 can be brought into engagement with the rail 200 as the bolt 108 is threaded into the lower clamp member 104. According to other exemplary embodiments, the lower clamp member 104 includes a through-hole or opening for the bolt 108 to pass through, and a nut is threadably engaged with the bolt 108. The clamp assembly 100 may be selectively coupled to, or removed from, different portions of the mounting member 200, so as to change a mounting position of a mobile device. The details of which are discussed in the paragraphs that follow. It should be understood that alternative fasteners may be used to perform the same or similar functions.

Figure 6:
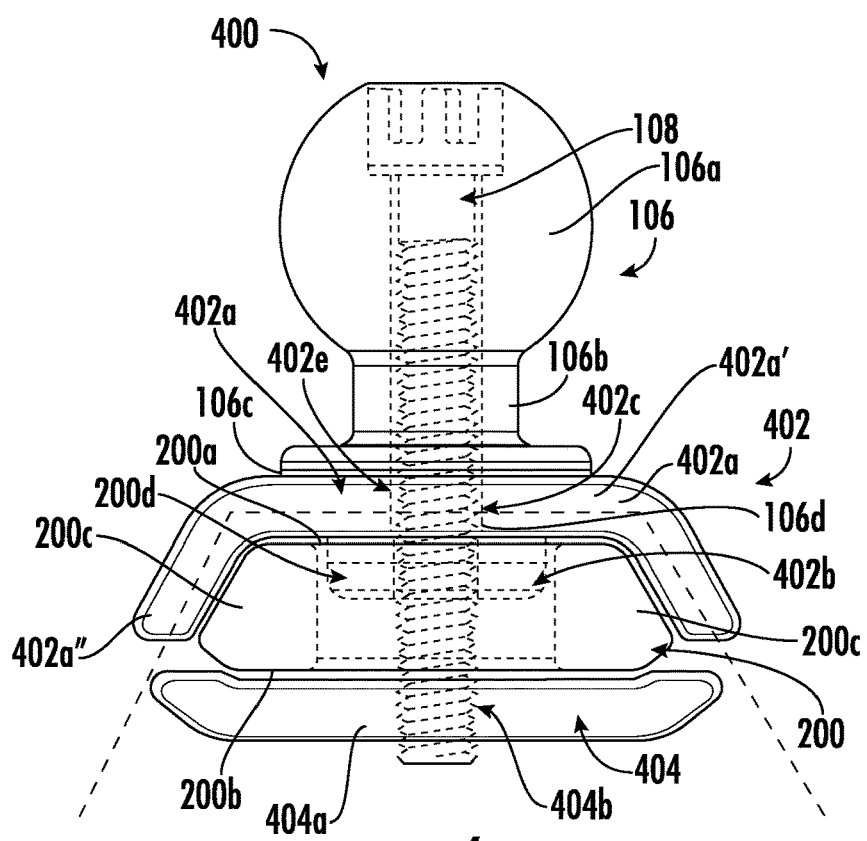
FIG. 6 is a side view illustrating an internal structure of the clamp assembly of FIG. 5.
Figure 7:
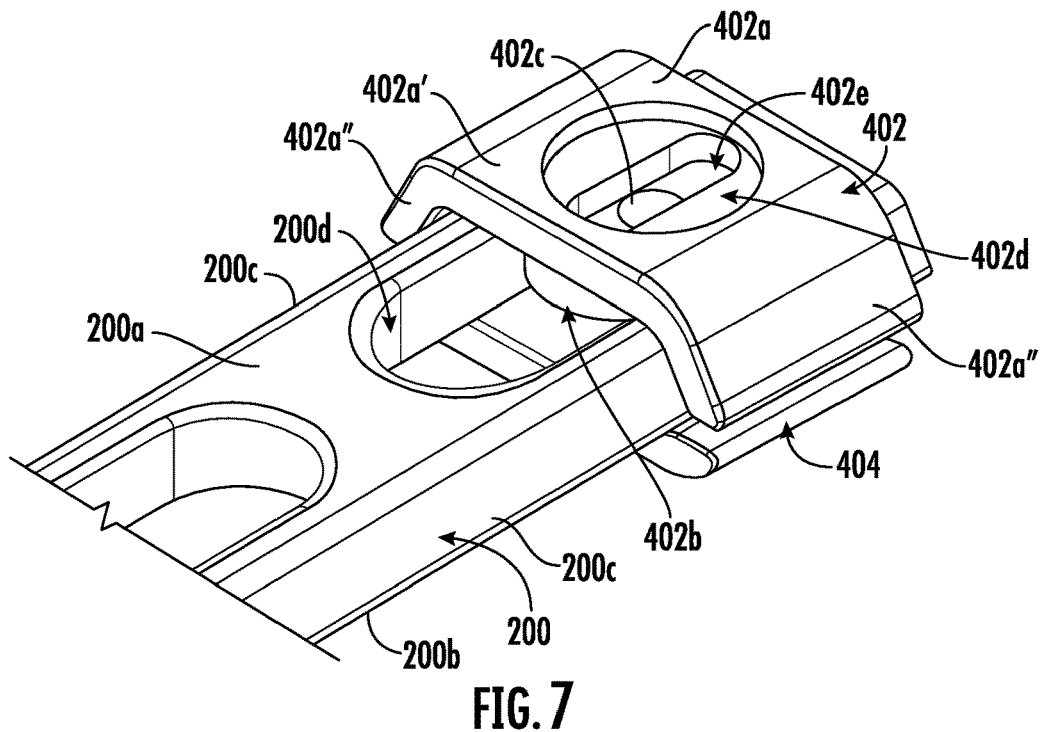
FIG. 7 is another partial perspective view of the clamp assembly of FIG. 5 shown without a mounting ball and fastener.
Figure 8:
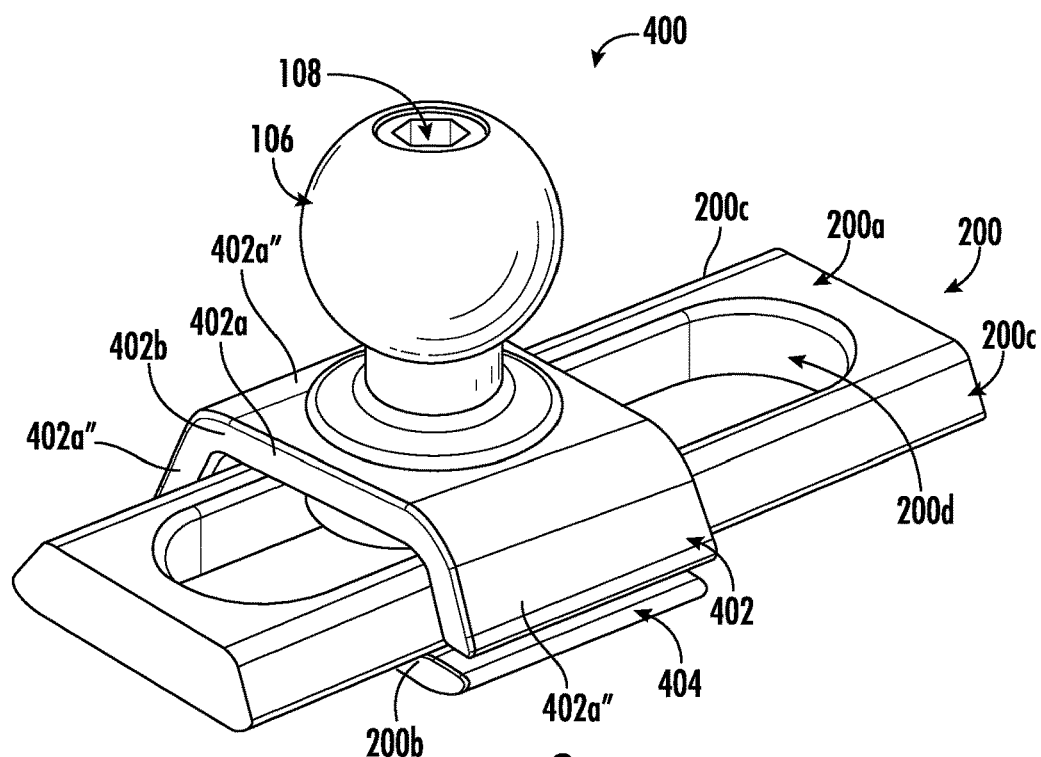
FIG. 8 is a perspective view of a prototype of the clamp assembly of FIG. 5.
Figure 9:
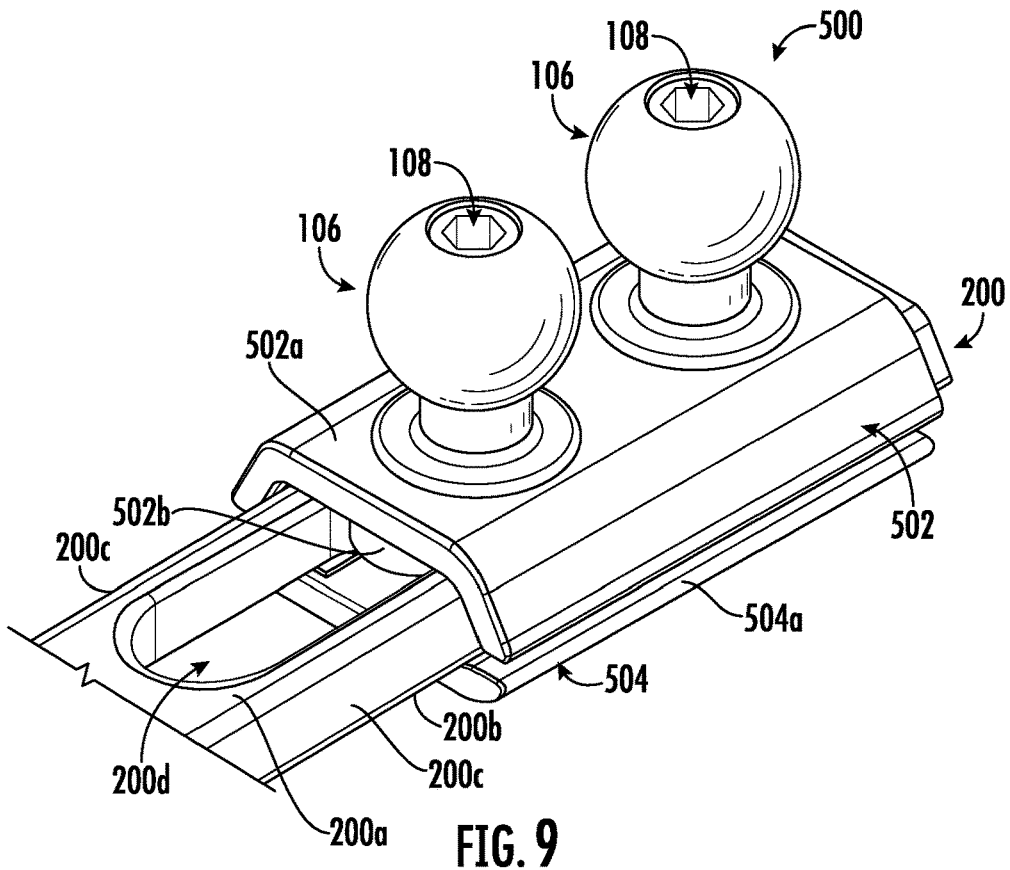
FIG. 9 is a partial perspective view of an illustrative clamp assembly, according to another exemplary embodiment.
Figure 10:
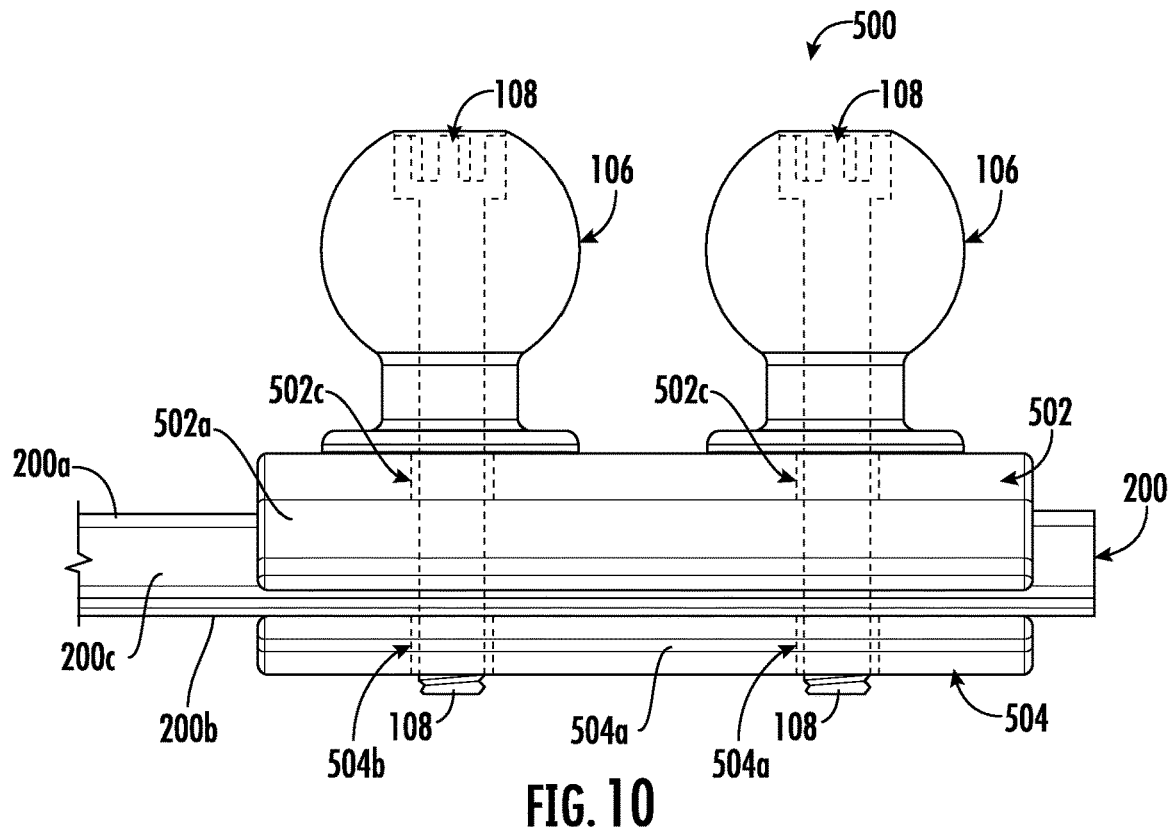
FIG. 10 is a front view illustrating an internal structure of the clamp assembly of FIG. 9.
Figure 11:
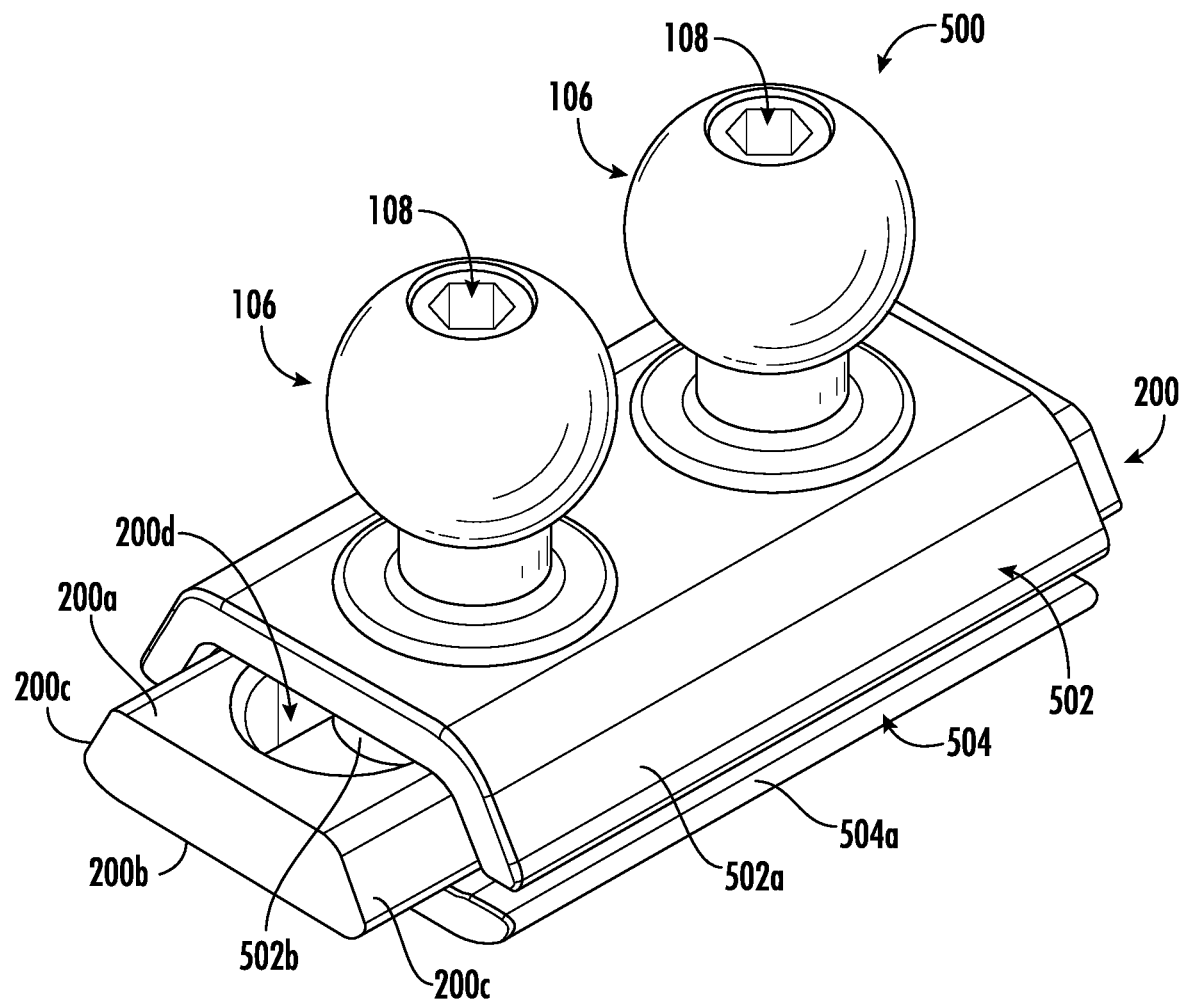
FIG. 11 is a perspective view of a prototype of the clamp assembly of FIG. 9.

The clamp assembly 100 may further include a mounting interface, shown as a ball mount 106 (e.g., spherical mount, etc.), according to an exemplary embodiment, which is coupled to, or integrally formed with, the upper clamp member 102. As shown in FIG. 2 (see also FIGS. 6 and 7), the ball mount 106 includes a ball portion 106a, standoff or shaft portion 106b connected to the ball portion 106a, and a base or pedestal 106c to which the shaft 106b connects. A protrusion 106d may extend from a bottom surface of the base 106c, where the protrusion may operate as a "key" that functions as an anti-rotation feature when inserted into a complementary recess 102e disposed in the upper clamp member 102 (see FIG. 7 and FIG. 12) to prevent rotation of the ball mount 106. According to other exemplary embodiments, the mounting interface may be another shaped mount for coupling a mobile device or other component (e.g., arms, etc.) to the rail 200. The ball mount 106 may be configured to mount various mobile devices or other types of mounting hardware (e.g., arms, adapters, etc.) to the rail 200. A bolt 108 is shown extending through the ball mount 106 to the lower clamp member 104. The head of the bolt 108 may be flush or recessed and accessible at an upper end of the ball mount 106, so as to allow for adjustment of the clamp assembly 100 (i.e., to be in a clamped state and unclamped state).

As shown in FIGS. 1-2 and 12, the upper clamp member 102 includes an upper clamp body 102a and a projection 102b (e.g., a first projection, etc.) extending from the upper clamp body 102a. The upper clamp body 102a is generally planar and is configured to engage with the upper surface 200a of the rail 200. According to other exemplary embodiments, the upper clamp body 102a may be substantially non-planar or includes substantially non-planar portions. The projection 102b extends axially away from a lower surface of the upper clamp body 102a and may be configured to be received at least partially in a slot 200d of the rail 200 when the upper clamp member 102 is engaged with the upper surface 200a. The projection 102b has an outer surface profile that is complementary to an inner surface profile of the rail 200 that defines the slot 200d, such that the projection 102b can substantially impede rotational movement of the upper clamp member 102 relative to the rail 200, but can allow for relative translational movement of the upper clamp member 102 (e.g., so as to allow for adjusting a translational position of the clamp assembly 100 on the rail 200, etc.).

For example, in the exemplary embodiment of FIGS. 1-2 and 12, the projection 102b has an elongated "stadium" cross-sectional shape defined by two straight, parallel side surfaces and two semi-circular end surfaces. According to other exemplary embodiments, the projection 102b may have any number of cross-sectional shapes, such as rectangular, square, trapezoidal, semi-circular, etc. The projection 102b is sized such that the width of the projection 102b, which is defined by the distance between the side surfaces, is slightly less than the width of the slot 200d, such that side surfaces can help to prevent rotation of the upper clamp member 102 relative to the rail 200 when assembled. The length of the projection 102b, which is defined by the distance between the semi-circular ends, is less than the length of the slot 200d, such that the upper clamp member 102 is permitted to translate relative to the rail 200 within the slot 200d (e.g., when the bolt 108 is loosened). The projection 102b may further include a curved or tapered (e.g. filleted, chamfered, etc.) lead-in surface at an outermost peripheral edge of the projection 102b, so as to help facilitate insertion of the projection 102b into the slot 200d during assembly to the rail 200.

As shown in FIGS. 2 and 12, the upper clamp member 102 further includes a recessed portion 102d disposed in an upper surface of the upper clamp body 102a. The recessed portion 102d is configured to receive a portion of the pedestal 106c of the ball mount 106. The upper clamp member 102 further includes a recess 102e disposed in a bottom surface of the recessed portion 102d, which is shown as an elongated slot that is complementary in shape to the protrusion 106d of the ball mount 106, so as to function as an anti-rotation feature of the ball mount 106 relative to the upper clamp member 102. An opening 102c extends from the recessed portion 102d and the recess 102e through the upper clamp body 102a and through the projection 102b. The opening 102c is configured to receive a portion of the bolt 108 therethrough for coupling the upper clamp member 102 to the lower clamp member 104. In an alternative embodiment, rather than the recessed portion 102d being defined in the upper surface of the upper clamp body 102a, the recessed portion 102d may be defined in the upper surface of the lower clamp body 104 that faces the bottom surface of the upper clamp body 102a and a projection of the ball mount 106 may extend through an opening defined in the rail 200 and extend into the recessed portion in the upper surface of the lower clamp member 104. It should be understood that protrusions and recessions may be positioned on opposite facing surfaces as described, but that the same or similar functionality of anti-rotation may be performed.

Still referring to FIGS. 1-2 and 12, the lower clamp member 104 has a similar structure as the upper clamp member 102. The lower clamp member 104 includes a lower clamp body 104a having a generally planar shape, although the lower clamp body 104a may have a substantially non-planar shape or include substantially non-planar portions, according to other exemplary embodiments. The lower clamp member 104 further includes a projection 104b (e.g., a second projection, etc.) extending from an upper surface of the lower clamp body 104a. According to an exemplary embodiment, the projection 104b has substantially the same structural configuration as the projection 102b of the upper clamp member 102 discussed above. In this way, the projection 104b is at least partially received in the slot 200d when the lower clamp member body 104a is engaged with the lower surface 200b of the rail 200, which can help to substantially impede rotational movement of the lower clamp member 104 relative to the rail 200 when assembled. The lower clamp member 104 further includes an opening 104b extending through the lower clamp body 104a. The lower clamp body 104a may define internal threads surrounding the opening 104b for threadably engaging the threads of the bolt 108.

In this manner, the projection 102b of the upper clamp member 102 and the projection 104b of the lower clamp member 104 can help to reduce rotational movement of the clamp assembly 100 relative to the rail 200 when assembled, thereby providing for a more stable mounting interface.

Figure 3:
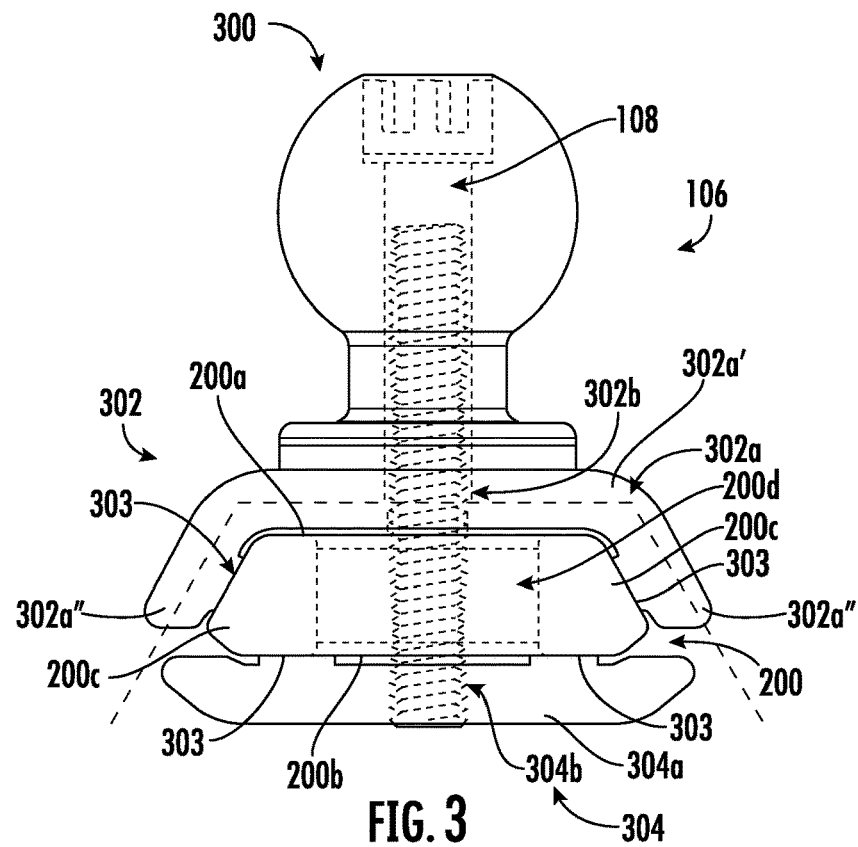
FIG. 3 is a partial perspective view of an illustrative clamp assembly coupled to a mounting member, according to another exemplary embodiment.
Figure 4:
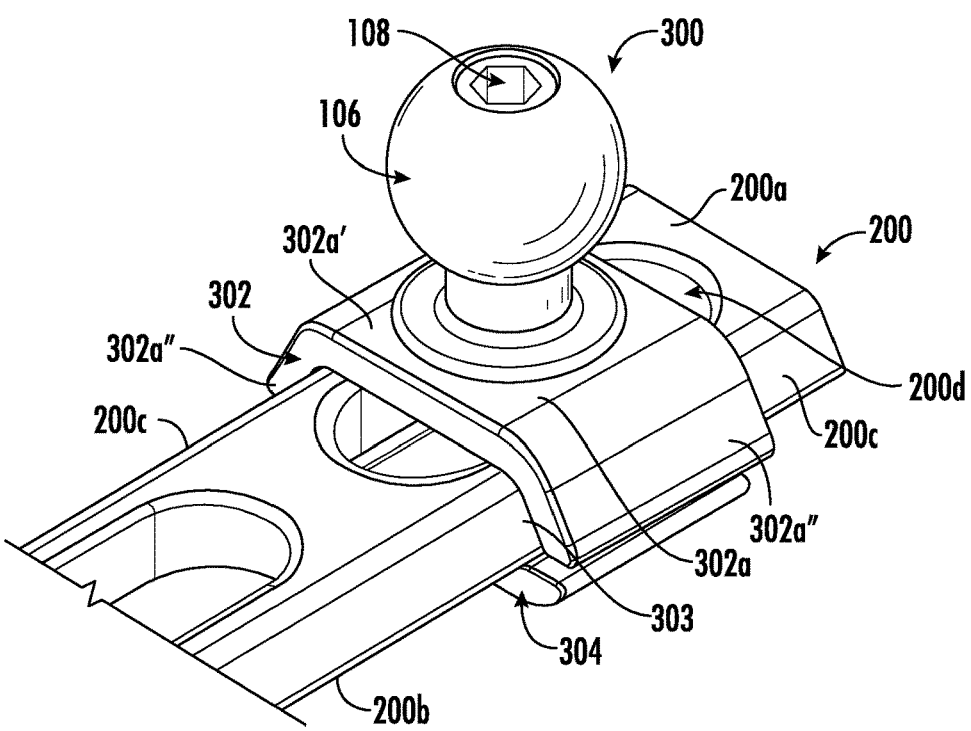
FIG. 4 is a side view illustrating the internal structure of the clamp assembly of FIG. 3.
Figure 5:
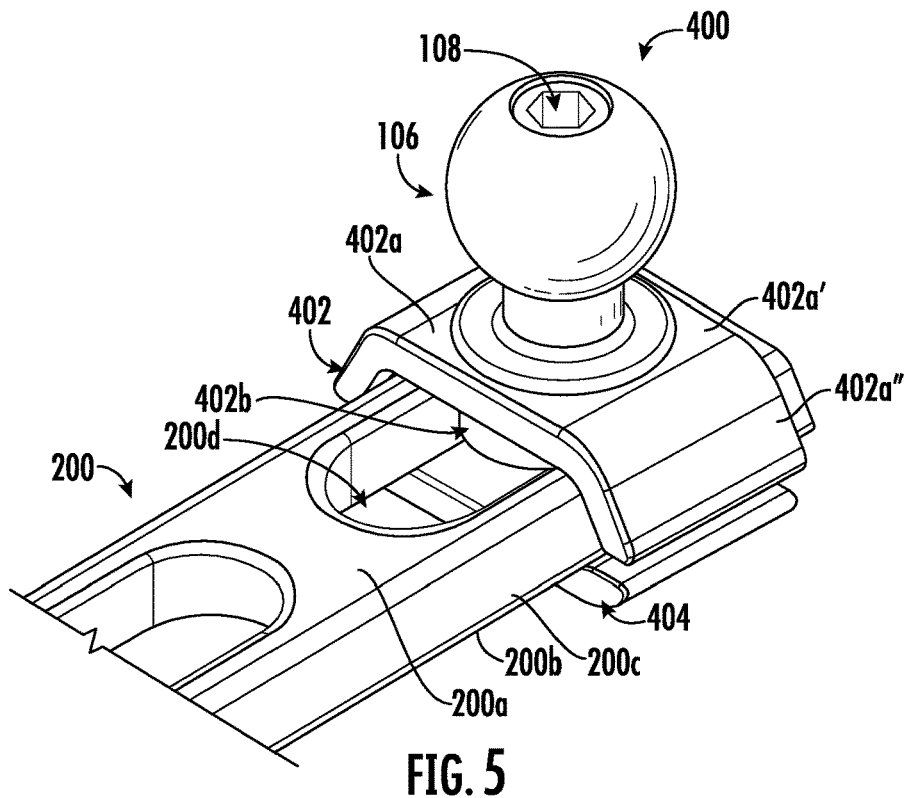
FIG. 5 is a partial perspective view of an illustrative clamp assembly coupled to a mounting member, according to another exemplary embodiment.

Referring to FIGS. 3-4, a clamp assembly 300 is shown according to another exemplary embodiment. In this exemplary embodiment, the clamp assembly 300 includes an upper clamp member 302 that is coupled to a lower clamp member 304. In contrast to the embodiment of FIGS. 1-2, the upper clamp member 302 and the lower clamp member 304 are each shown without a projection, although it should be appreciated that the upper clamp member 302 and/or the lower clamp member 304 may include a projection, according to other exemplary embodiments.

As shown in FIGS. 3-4, the upper clamp member 302 includes an upper clamp body 302a defined by a first portion 302a' that is generally planar, although the first portion 302a' may be substantially non-planar or include substantially non-planar portions, according to other exemplary embodiments. The first portion 302a' engages the upper surface 200a of the rail 200. The upper clamp body 302a further includes a second portion 302a" that extends laterally from opposite sides of the first portion 302a' at an obtuse angle relative to the bottom surface of the upper clamp body 302a, so as to define a pair of arms (e.g., wings, extensions, etc.). The second portion 302a" is shown to extend substantially the same distance as the side surfaces 200c of the rail. In this way, the upper clamp body 302a defines an inner surface profile that is complementary to an outer surface profile of the rail 200 (e.g., along the upper surface 200a and the side surfaces 200c). This complementary shape of the upper clamp body 302a can help to impede rotational movement of the upper clamp member 302 relative to the rail 200 when assembled.

The upper clamp member 302 further includes one or more pads 303 coupled to, or integrally formed with, the upper clamp member 302. The pads 303 may be configured as discrete strips of material. In the exemplary embodiment of FIGS. 3-4, the pads 303 are shown disposed on a lower surface of the second portion 302a" adjacent the side surfaces 200c of the rail. The pads 303 may be made from a compressible material (e.g., PTFE, neoprene, rubber, etc.) that can help to create a friction-fit interface with the rail 200. For example, when the upper clamp member 302 is coupled to the lower clamp member 304 via the bolt 108, the pads 303 will compress against the side surfaces 200c of the rail 200 between the upper clamp member 302 and the rail, so as to create an interference condition. In this way, the pads 303 can, advantageously, cooperate with the arms to substantially impede movement of the upper clamp member 302 relative to the rail 200.

Still referring to FIGS. 3-4, the lower clamp member 304 is defined by a lower clamp body 304a having a generally planar shape, although the lower clamp member 304 may be substantially non-planar or include substantially non-planar portions, according to other exemplary embodiments. The lower clamp member 304 includes one or more pads 303 coupled to, or integrally formed with, an upper surface of the lower clamp body 304a. The pads 303 on the lower clamp member 304 are configured to engage the lower surface 200b of the rail 200 in a similar manner as the pads 303 on the upper clamp member 302 engaging the side surfaces 200c. In this way, the pads 303 on the lower clamp member 304 can help to reduce or impede relative movement between the lower clamp member 304 and the rail 200. The lower clamp member 304 further includes an opening 304b extending through the lower clamp body 304a. The lower clamp body 304a may define internal threads surrounding the opening 304b for threadably engaging the threads of the bolt 108.

In this manner, the complementary shape of the upper clamp member 302 to the rail 200 and the pads 303 on the upper clamp member 302 and/or the lower clamp member 304 can cooperate to help to substantially impede rotational movement of the clamp assembly 300 relative to the rail 200 when assembled, thereby providing for a more stable mounting interface.

Referring to FIGS. 5-8 and 13, a clamp assembly 400 is shown according to another exemplary embodiment. In this exemplary embodiment, the clamp assembly 400 includes an upper clamp member 402 that is coupled to a lower clamp member 404. In contrast to the embodiments of FIGS. 1-4, the upper clamp member 402 includes a combination of a projection 402b and an upper clamp body 402a having a shape that is complementary to a portion of the rail 200. It should be appreciated, however, that the lower clamp member 404 may also include a projection and/or one or more pads 303, and the upper clamp member 402 may include one or more pads 303, according to other exemplary embodiments.

As shown in FIGS. 5-8 and 13, the upper clamp member 402 has a similar structure as the upper clamp member 302. In particular, the upper clamp member 402 includes an upper clamp body 402a having a first portion 402a' that is substantially planar, although the first portion may be substantially non-planar shape or include substantially non-planar portions, according to other exemplary embodiments. The upper clamp body 402a further includes a second portion 402a" extending outwardly at an obtuse angle from opposite sides of the first portion 402a', so as to define arms or wings of the upper clamp body 402a. The second portion 402a" is shown to extend substantially the same distance as the side surfaces 200c of the rail. In this way, the upper clamp body 402a defines an inner surface profile that is complementary to an outer surface profile of the rail 200 (e.g., along the upper surface 200a and the side surfaces 200c). This complementary shape of the upper clamp body 402a can help to impede rotational movement of the upper clamp member 402 relative to the rail 200 when assembled.

As shown in FIGS. 5-8 and 13, the upper clamp member 402 further includes a recessed portion 402d disposed in an upper surface of the upper clamp body 402a. The recessed portion 402d is configured to receive a portion of the pedestal 106c of the ball mount 106. The upper clamp member 402 further includes a recess 402e disposed in a bottom surface of the recessed portion 402d, which is shown as an elongated slot that is complementary in shape to the protrusion 106d of the ball mount 106, so as to function as an anti-rotation feature of the ball mount 106 relative to the upper clamp member 402. An opening 402c extends from the recessed portion 402d and the elongated slot 402e through the upper clamp body 402a. The opening 402c is configured to receive a portion of the bolt 108 therethrough for coupling the upper clamp member 402 to the lower clamp member 404. In an alternative embodiment, rather than the recessed portion 402d being defined in the upper surface of the upper clamp body 402a, the recessed portion 402d may be defined in the upper surface of the lower clamp body 404 that faces the bottom surface of the upper clamp body 402a and a projection of the ball mount 106 may extend through an opening defined in the rail 200 and extend into the recessed portion in the upper surface of the lower clamp member 404. It should be understood that protrusions and recessions may be positioned on opposite facing surfaces as described, but that the same or similar functionality of anti-rotation may be performed.

Still referring to FIGS. 5-8 and 13, the upper clamp member 402 further includes a projection 402b extending from a bottom surface of the first portion 402a. Similar to the projection 102b discussed above in the embodiment of FIGS. 1-2, the projection 402b extends axially away from a lower surface of the upper clamp body 402a and is configured to be received at least partially in a slot 200d of the rail 200 when the upper clamp member 402 is engaged with the upper surface 200a. The projection 402b has an outer surface profile that is complementary to an inner surface profile of the rail 200 that defines the slot 200d, such that the projection 402b can substantially impede rotational movement of the upper clamp member 402 relative to the rail 200, but can allow for relative translational movement with the projection 102b inserted into the slot (e.g., so as to allow for adjusting a position of a mobile device, etc.). According to an exemplary embodiment, the projection 402b may have the same structural configuration as the projection 102b. According to other exemplary embodiments, the projection 402b may have a different structural shape and configuration than the projection 102b.

In this manner, the complementary shape of the upper clamp member 402 and the projection 402b on the upper clamp member 402 can cooperate to help substantially impede rotational movement of the clamp assembly 400 relative to the rail 200 when assembled, thereby providing for a more stable mounting interface.

Referring to FIGS. 9-11 and 14, a clamp assembly 500 is shown according to another exemplary embodiment. This exemplary embodiment is substantially the same as the embodiment of FIGS. 5-8, but the upper clamp member 502 and the lower clamp member 504 have an elongated shape to accommodate a plurality of mounting interfaces or mounts, shown as ball mounts 106. In the exemplary embodiment of FIGS. 9-11, the clamp assembly 500 is shown to include two ball mounts 106. It should be appreciated, however, that the upper clamp member 502 and the lower clamp member 504 may be configured to accommodate more than two mounting interfaces, according to other exemplary embodiments.

Referring now to FIGS. 1-14, a method of assembling a clamp assembly 100, 300, 400, 500 to a mounting member will be described, according to an exemplary embodiment. In a first step, an upper clamp member 102a, 302a, 402a, 502a is placed at a desired location on an upper surface 200a of a rail 200. In the exemplary embodiments of FIGS. 1-2, 5-8, and 9-11, the projections 102b, 402b, 502b of the respective upper clamp members are inserted into the slot 200d of the rail. In a second step, a lower clamp member 104a, 304a, 404a, 504a is placed on an opposite lower surface 200b of the rail 200. In the exemplary embodiment of FIGS. 1-2, the projection 104b is inserted into the slot 200d of the rail. In a third step, a mounting interface, shown as a ball mount 106, is disposed on the upper clamp member 102a, 302a, 402a, 502a. In a fourth step, a bolt 108 is inserted through the ball mount 106, the upper clamp members 102a, 302a, 402a, 502a, and the slot 200d. In a fifth step, the bolt 108 is threadably engaged with the lower clamp member 104a, 304a, 404a, 504a. The bolt 108 can be tightened to clamp the respective upper and lower clamp members together against a portion of the rail 200, so as to secure a position of the respective clamp assembly on the rail 200. It should be understood that alternative steps and alternative orders of the steps may be utilized.

It is noted that any element disclosed in one embodiment may be incorporated or utilized with any other embodiment disclosed herein. For example, the projection 102b of the exemplary embodiment described in connection with FIGS. 1-2 may be incorporated in the upper clamp member 302 and/or the lower clamp member 304 of the exemplary embodiment described in connection with FIGS. 3-4. Although only one example of an element from one embodiment that can be incorporated or utilized in another embodiment has been described above, it should be appreciated that any other elements (e.g., projections, pads, complementary features, anti-rotation features, etc.) of the various embodiments may be incorporated or utilized with any of the other embodiments disclosed herein.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A clamp assembly comprising:
an upper clamp member including a first projection extending from a lower surface thereof, the first projection configured to be at least partially received in a complementary opening of a mounting member; and
a lower clamp member removably coupled to the upper clamp member, the lower clamp member including a second projection extending from an upper surface thereof, the second projection configured to be at least partially received in the complementary opening, the first projection and the second projection being configured to substantially impede rotation of the clamp assembly relative to the mounting member; and
a mount configured to be attached to the upper clamp member, the mount including a mount interface region, a shaft, and a base, the base including a bottom surface from which an anti-rotation feature extends, the anti-rotation feature, when inserted into a complementary anti-rotation feature disposed on a top surface of the upper clamp member, prevents the mount from rotating relative to the upper clamp member.

2. The clamp assembly of claim 1, wherein the first projection and the second projection are each configured to allow for translational movement of the clamp assembly relative to the mounting member.

3. The clamp assembly of claim 1, wherein the upper clamp member includes a first portion and a second portion extending outwardly from opposite sides of the first portion, the second portion extending at an obtuse angle relative to a surface of the first portion.

4. The clamp assembly of claim 3, wherein at least one of the upper clamp member or the lower clamp member includes a pad configured to engage a portion of the mounting member.

5. The clamp assembly of claim 1, further comprising a fastener extending through the mount and the upper clamp member, the fastener configured to threadably engage the lower clamp member to couple the clamp assembly to the mounting member.

6. A clamp assembly comprising:
an upper clamp member including a first projection extending from a lower surface thereof, the first projection configured to be at least partially received in a complementary opening of a mounting member;
a lower clamp member removably coupled to the upper clamp member, the lower clamp member including a second projection extending from an upper surface thereof, the second projection configured to be at least partially received in the complementary opening, the first projection and the second projection being configured to substantially impede rotation of the clamp assembly relative to the mounting member, at least one of the upper clamp member or the lower clamp member includes a pad configured to engage a portion of the mounting member, the pad made from a compressible material; and
a mount configured to be attached to the upper clamp member.

7. A clamp assembly comprising:
an upper clamp member including:
a first portion;
a second portion extending outwardly from opposite sides of the first portion, the second portion extending at an obtuse angle relative to a bottom surface of the first portion; and
a first pad configured to engage a mounting member, the first pad made from a compressible material;
a lower clamp member removably coupled to the upper clamp member, the second portion and the first pad being cooperatively configured to substantially impede rotation of the clamp assembly relative to the mounting member; and
a mount configured to be attached to the upper clamp member.

8. The clamp assembly of claim 7, wherein the upper clamp member further comprises a projection extending from the bottom surface, the projection configured to be at least partially received in a complementary opening of the mounting member.

9. The clamp assembly of claim 7, wherein the lower clamp member includes a projection extending from an upper surface thereof, the projection configured to be at least partially received in a complementary opening of the mounting member.

10. The clamp assembly of claim 7, wherein the lower clamp member includes a second pad configured to engage the mounting member.

11. The clamp assembly of claim 10, wherein the first pad and the second pad are each made from a compressible material.

12. A clamp assembly comprising:
an upper clamp member including:
a first portion;
a second portion extending outwardly from opposite sides of the first portion, the second portion extending at an obtuse angle relative to a bottom surface of the first portion; and
a first pad configured to engage a mounting member;
a lower clamp member removably coupled to the upper clamp member, the second portion and the first pad being cooperatively configured to substantially impede rotation of the clamp assembly relative to the mounting member; and
a mount configured to be attached to the upper clamp member, the mount including a mount interface region, a shaft, and a base, the base including a bottom surface from which an anti-rotation feature extends, the anti-rotation feature, when inserted into a complementary anti-rotation feature disposed on a top surface of the upper clamp member, prevents the mount from rotating relative to the upper clamp member.

13. The clamp assembly of claim 12, further comprising a fastener extending through the mount and the upper clamp member, the fastener configured to threadably engage the lower clamp member to couple the clamp assembly to the mounting member.

14. A clamp assembly comprising:
an upper clamp member comprising:
a first portion;
a second portion extending outwardly from opposite sides of the first portion, the second portion extending at an obtuse angle relative to a bottom surface of the first portion; and
a projection extending from the bottom surface, the projection configured to be at least partially received in a complementary opening of a mounting member; and
a lower clamp member removably coupled to the upper clamp member, the second portion and the projection being cooperatively configured to substantially impede rotation of the clamp assembly relative to the mounting member; and
a mount configured to be attached to the upper clamp member, the mount including a mount interface region, a shaft, and a base, the base including a bottom surface from which an anti-rotation feature extends, the anti-rotation feature, when inserted into a complementary anti-rotation feature disposed on a top surface of the upper clamp member, prevents the mount from rotating relative to the upper clamp member.

15. The clamp assembly of claim 14, wherein the lower clamp member includes a projection extending from an upper surface thereof, the projection configured to be at least partially received in the complementary opening.

16. The clamp assembly of claim 14, wherein at least one of the upper clamp member or the lower clamp member includes a pad configured to engage a portion of the mounting member.

17. The clamp assembly of claim 14, further comprising a fastener extending through the mount and the upper clamp member, the fastener configured to threadably engage the lower clamp member to couple the clamp assembly to the mounting member.

18. A clamp assembly comprising:
an upper clamp member comprising:
a first portion;
a second portion extending outwardly from opposite sides of the first portion, the second portion extending at an obtuse angle relative to a bottom surface of the first portion; and
a projection extending from the bottom surface, the projection configured to be at least partially received in a complementary opening of a mounting member;
a lower clamp member removably coupled to the upper clamp member, the second portion and the projection being cooperatively configured to substantially impede rotation of the clamp assembly relative to the mounting member, at least one of the upper clamp member or the lower clamp member includes a pad configured to engage a portion of the mounting member, the pad made from a compressible material; and
a mount configured to be attached to the upper clamp member.

* * * * *